April 19, 1966     J. D. RICHARD     3,246,523
PRESSURE RATE MEASURING APPARATUS
Filed Dec. 10, 1963     2 Sheets-Sheet 1
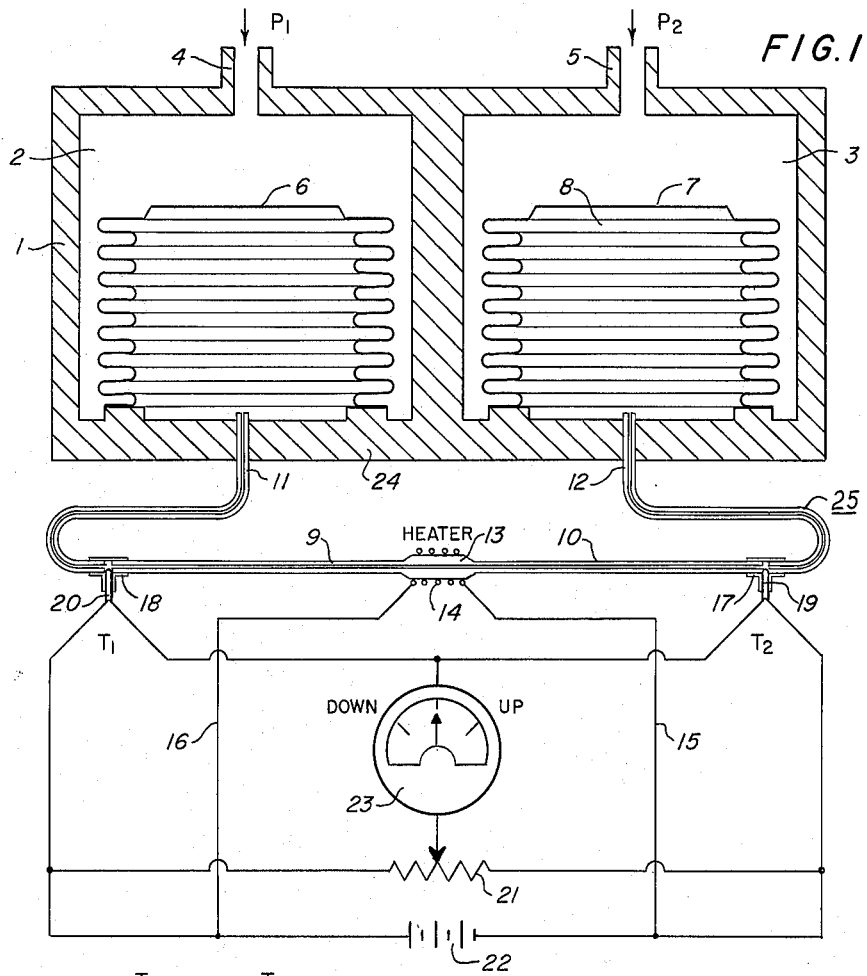
FIG. 1
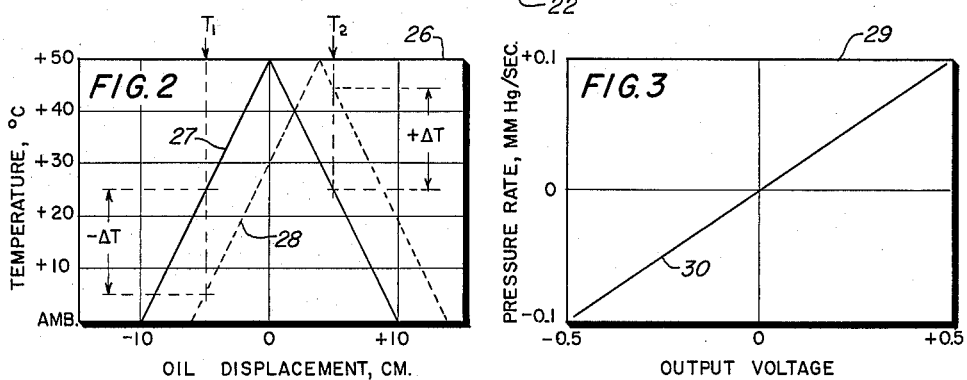
FIG. 2
FIG. 3
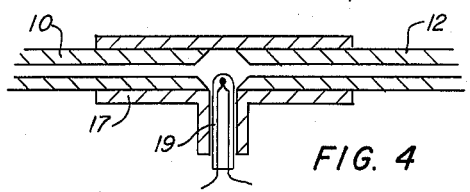
FIG. 4
INVENTOR
Joseph D. Richard April 19, 1966   J. D. RICHARD   3,246,523
PRESSURE RATE MEASURING APPARATUS
Filed Dec. 10, 1963

FLOW ACCELERATION

INVENTOR
Joseph D. Richard 3,246,523
PRESSURE RATE MEASURING APPARATUS
Joseph D. Richard, Miami, Fla.
(531 S. Barrancas Ave., Pensacola, Fla.)
Filed Dec. 10, 1963, Ser. No. 329,478
5 Claims. (Cl. 73—407)

This invention relates generally to apparatus for measuring the pressure characteristics of a fluid medium and more particularly to a measuring and indicating apparatus for determining the time rate of change of pressure.

There have been many methods available in the past for measuring fluid pressure. The output signals of these various pressure measuring devices could, of course, be electrically differentiated for the determination of pressure rate. However, there have been only a few methods and devices available for the direct sensing of pressure rate. These devices available in the past have been susceptible to serious mechanical problems and have also had inherent limitations in sensitivity and accuracy. The most commonly used pressure rate device has been the rate-of-climb indicator used in aircraft. These instruments consist of an aneroid pressure capsule or bellows with a mechanical linkage to an indicating dial. A small orifice allows the pressure within the bellows element to equalize with the atmospheric pressure at only a limited rate. Relatively rapid changes in atmospheric pressure, therefore, result in the compression or expansion of the bellows element at a rate in excess of the equalization capabilities of the leakage orifice. These deflections are mechanically translated into a rate-of-climb indication on the instrument dial. These mechanical pressure rate indicators are fragile and inaccurate and, although they are sensitive enough for use as aircraft rate-of-climb indicators, they are not sufficiently sensitive for use in other potentially important pressure rate measuring applications such as for the direct indication of the rate of change of atmospheric pressure.

It is an object therefore of the present invention to provide a method and apparatus for the direct measurement of pressure rate which is devoid of the abovementioned limitations and which is otherwise practical and inexpensive.

Another object of the present invention is to provide apparatus for the direct indication of pressure rate which is rugged and simple to construct and which can sustain considerable mechanical shock without impairment of operation or calibration.

Still another object of the present invention is to provide pressure rate measuring apparatus which is inherently sensitive and which can be used for the direct measurement of atmospheric pressure rate and other applications requiring a higher order of sensitivity than heretofore available.

The presently described invention provides a method and apparatus for determining the time rate of change of pressure by measuring the differential transfer of a liquid between two pressure responsive capsules which are exposed to differential pressures. The rate and direction of fluid flow in a capillary tubing connecting the two capsules is measured to determine the time rate of change of differential pressure. The rate and direction of fluid flow is determined by measuring the change in symmetry of temperature gradients adjacent a heated section of the capillary tubing resulting from the transfer of heat by the moving liquid.

Other objects and advantages of this invention will be readily appreciated from the following detailed description and by reference to the accompanying drawings in which:

FIGURE 1 is a schematic and sectional view of a differential pressure rate indicating device according to the present invention.

FIGURE 2 is a diagram which shows how the temperature differentials vary in the apparatus of FIGURE 1 in response to an applied differential pressure.

FIGURE 3 shows the output voltage as a function of differential pressure rate for the apparatus in FIGURE 1.

FIGURE 4 shows a detailed sectional view of one of the thermistors in the apparatus of FIGURE 1.

Figure 5:
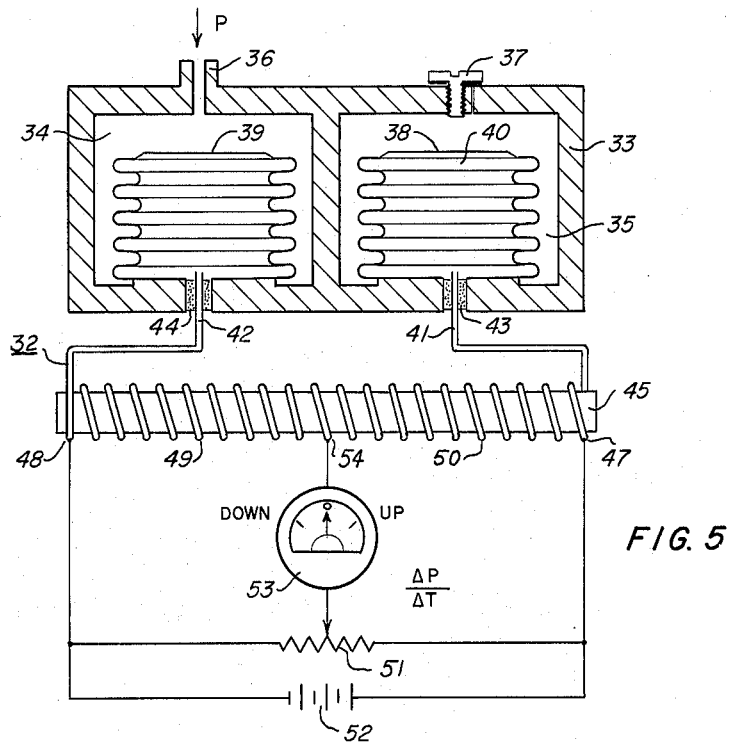
FIGURE 5 is a schematic and sectional view of another construction of the pressure rate indicating device according to the present invention.

In FIGURE 1 a compressible bellows 6 is shown mounted within the pressure resistant chamber 2 inside the housing 1. External pressure may be applied through the pressure input fitting 4. A second compressible bellows 7 is shown mounted within a second pressure resistant chamber 3. External pressure signals may be applied inside the second chamber through the pressure input fitting 5. The bellows 6 and 7 are sealed so that they tend to compress in response to applied pressure. A thermally conductive capillary tube 25 interconnects the two bellows 6 and 7. The bellows 6 and 7 and the interconnecting capillary tube 25 are entirely filled with a liquid such as silicone oil 8. A heater 14 operating from the battery 22 is used to heat the center portion 13 of the capillary tube 25 to a temperature considerably above ambient temperature. The ends 11 and 12 of the capillary tube 25 are maintained at near ambient temperature by means of the heat sink action of the base 24 of the housing 1. Symmetrical thermal gradients are produced around the center 13 of the capillary tube 25 by heat flow in both directions from the heater 14. Conduction of heat from the heated center portion 13 of the capillary tube 25 results in symmetrical thermal gradients on both sides of the center ranging from maximum to ambient. For example, the temperature at the center may be 50° C. above ambient and decrease evenly in both directions so that the temperature at the thermistor fittings 17 and 18 are at 25° C. above ambient and the capillary ends 11 and 12 are at ambient temperature. The temperature distribution along the capillary 25 is represented by the plotted line 27 in FIGURE 2. When the oil within the capillary tube 25 is not flowing, it is maintained at the same temperature as the capillary tube itself. A thermistor 19 is mounted within the fitting 17 so that the temperature sensitive tip is in contact with the oil within the capillary 25. The mounting of the thermistor 19 is shown in greater detail in FIGURE 4. A second thermistor 20 is mounted in a fitting 18 in the opposite half of the capillary tube 25. The two thermistors 19 and 20 are connected in a Wheatstone bridge arrangement with the balancing resistance 21. The battery 22 is connected across the bridge circuit and the meter 23 indicates the bridge output.

When static pressure conditions exist within the two pressure chambers 2 and 3, there is no transfer of the liquid 8 between the two bellows 6 and 7 through the capillary tube 25. The thermistors 19 and 20 are at the same temperature and their resistances are therefore equal. The bridge circuit may be balanced with the potentiometer resistance 21 so that the meter 23 reads zero. It may readily be observed that the balanced, or zero output, condition will continue regardless of the differential pressure as long as the pressures within the two chambers remain static.

FIGURE 2 shows the temperature distribution 27 along the capillary tube 25 ten centimeters on each side of the center for static pressure conditions. The thermistor temperatures $T_1$ and $T_2$ are equal at 25° C. above ambient. When the pressure within the chamber 2 is increased instantaneously to a certain higher static value, the oil within the capillary tube 25 is displayed suddenly four centimeters to the right. The oil temperature $T_2$ sensed by the thermistor 19 is suddenly increased to 45° C. above ambient and the oil temperature $T_1$ sensed by the thermistor 20 is suddenly decreased to 5° C. above ambient. The differential temperature of 40° C. sensed by the two thermistors results in a corresponding unbalance of the bridge. The direction and magnitude of the bridge unbalance is indicated by the meter 23. When the pressure differential becomes static the thermistor temperatures rapidly equalize as the oil assumes the temperature of the surrounding capillary tube. The output of the meter 23 is a function of the time rate of change of the differential pressure between the chambers 2 and 3. FIGURE 3 shows the relationship 30 between output voltage and pressure rate for the indicating apparatus shown in FIGURE 1. FIGURE 4 shows the thermistor element in greater detail. The thermistor bead and connecting wires are molded within a glass rod. The thermistor bead is near the tip of the glass rod so that it is primarily sensitive to the oil temperature within the capillary tube and relatively insensitive to the temperature of the capillary tube itself.

FIGURE 5 shows a pressure rate indicating apparatus in which a capillary tube 32 of relatively high electrical resistance interconnects the two oil filled bellows 38 and 39. For example the capillary tube 32 may preferably be of thin walled stainless steel. The capillary tube 32 is coiled around a cylindrical mandrel 45. The two ends 41 and 42 of the capillary tube 32 are insulated from the housing 33 by means of the insulator bushings 43 and 44. Electrical current is passed through the capillary tube 32 by means of the battery 52. The capillary tube 32 is thus heated along its entire length. An electrical connection 54 is made to the center of the capillary tube 32 from one side of the meter 53. The two ends of the potentiometer resistor 51 are connected to the ends 47 and 48 of the capillary tube 32. The two electrical resistances formed by the two halves 49 and 50 of the capillary tube 32 are thus connected in a Wheatstone bridge circuit with the battery 52 across the bridge. The bridge circuit output is indicated by the meter 53. As long as the pressure conditions within the two pressure chambers 34 and 35 remain static, there will be no flow of the oil 40 between the two bellows 38 and 39 through the capillary tube 32. Under these static conditions the temperature gradients along both havles 49 and 50 of the capillary tube 32 will be symmetrical and equal. As a result the electrical resistance of the left half 49 will be equal to the right half 50. The bridge circuit may then remain balanced as long as the pressure conditions remain static.

External pressure may be applied into the pressure chamber 34 through the fitting 36. The pressure chamber 35 is shown sealed by the seal screw 37. The apparatus shown in FIGURE 5 is adapted to indicate the time rate of pressure into the pressure chamber 34 relative to the fixed reference pressure within the chamber 35. Obviously, the same apparatus may be used to indicate rate of change of two varying differential pressures by the addition of a pressure input in place of the seal screw 37. When pressure is applied through the fitting 36 the bellows 39 is compressed thus forcing the contained oil through the capillary 32 and into the opposite bellows 38. The displacement of oil to the right inside the capilarry tube 32 results in a transfer of heat in the same direction thereby tending to decrease the temperature of the left half 49 and increase the temperature of the right half 50 of the capillary tube 32. The decrease in temperature results in a decrease in electrical resistance of the left half 49 of the capillary tube 32. The increase in temperature results in an increase in electrical resistance of the right half 50 of the capillary tube 32. The transfer of heat and the resulting unbalance of electrical resistance between the two halves 49 and 50 of the capillary tube 32 is a direct function of the rate of change of pressure in the chamber 34. The relative change of electrical resistance between the two halves 49 and 50 of the capillary tube 32 results in an unbalance of the bridge circuit which is indicated by the meter 53. It may be seen therefore that the meter 53 will indicate the direction and magnitude of the rate of change of pressure introduced into the chamber 34.

Figure 6:
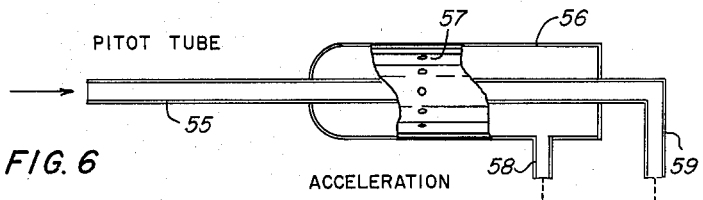
FIGURE 6 shows how the pressure rate indicator may be used with a pitot tube for the indication of acceleration.

FIGURE 6 shows how a pressure rate indicating device according to the present invention may be used with a conventional pitot tube to indicate acceleration. The indicator 60 shows the time rate of change of velocity as a function of the time rate of change of differential pressure between the pitot 55 and static 57 inputs of the conventional pitot sensor.

Figure 7:
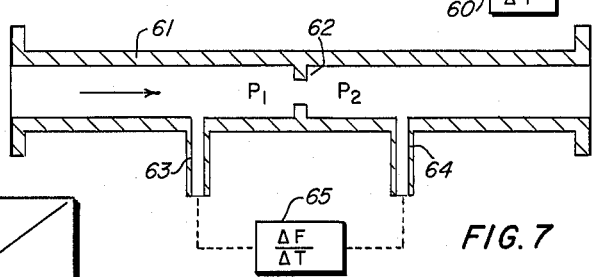
FIGURE 7 shows how the pressure rate indicator may be used with an orifice flow tube for the indication of flow acceleration.

FIGURE 7 shows how a pressure rate indicating device according to the present invention may be used with a conventional orifice flow tube to indicate flow acceleration. The indicator 65 shows the time rate of change of flow rate as a function of the time rate of change of differential pressure across the flow orifice.

Figure 8:
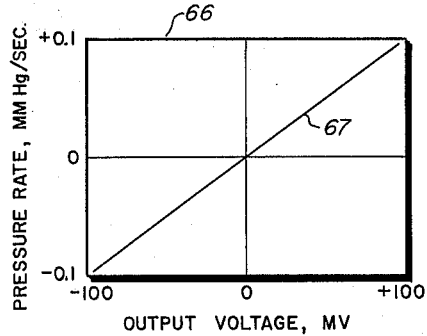
FIGURE 8 shows the output voltage as a function of pressure rate for the apparatus of FIGURE 5.

FIGURE 8 shows the output voltage of the bridge circuit of FIGURE 1 as a function of the pressure rate applied into the pressure chamber 34.

It may be seen therefore that I have provided apparatus for the indication of pressure rate which is new and useful in a number of applications. Obviously, many modifications can be made in the specific construction described herein. The capillary tube in the apparatus shown in FIGURE 1 should preferably be of relatively thick walled copper tubing. The capillary tube shown in FIGURE 5 should be of thin walled stainless steel tubing. The capillary tubing should preferably be surrounded by a thermal insulator to minimize heat loss. Thermocouples could be used as an alternative method for sensing differential temperature in the apparatus of FIGURE 1. Silicone oil may be used to fill the bellows and capillary tube. The desired damping may be achieved by selection of silicone oil of a suitable viscosity. As an alternative a liquid of low viscosity may be used to achieve maximum speed of response of the pressure rate indicator.

What is claimed is:

1. Apparatus for measuring the time rate of change of pressure comprising: a first pressure resistant chamber; means for connecting the inside of the said first chamber to an external variable pressure source; a first sealed resilient bellows mounted within the said first chamber, the said first bellows being compressible in response to increased pressure and expandable in response to decreased pressure; a second pressure resistant chamber; means for connecting the inside of the said second chamber to an external variable pressure source; a second sealed resilient bellows mounted within the said second chamber, the said second bellows having characteristics similar to the said first bellows; a liquid contained within the said first and second bellows; an elongated capillary tube interconnecting the contained liquid within the said first and second bellows, the said liquid being readily transferred between the two bellows through the said capillary tube in response to differential pressures within the said first and second pressure chambers; means for heating an intermediate portion of the said capillary tube between the said first and second bellows; a first temperature responsive means interposed in the said capillary tube between the said heating means and the said first bellows; a second temperature responsive means interposed in the said capillary tube between the said heating means and the said second bellows; means for measuring the temperature differential between the said first and second temperature responsive means; and means for indicating the rate of change of differential pressure between the said first and second pressure chambers as a function of the aforementioned measured differential temperature.

2. Apparatus for measuring the time rate of change of pressure comprising: a first pressure resistant chamber; means for connecting the inside of the said first chamber to an external variable pressure source; a first sealed resilient bellows mounted within the said first chamber, the said first bellows being compressible in response to increased pressure and expandable in response to decreased pressure; a second pressure resistant chamber having a sealable vent so that a volume of gas may be contained therein to serve as a reference pressure; a second sealed resilient bellows mounted within the said second chamber, the said second bellows having characteristics similar to the said first bellows; a liquid contained within the said first and second bellows; an elongated capillary tube interconnecting the contained liquid within the said first and second bellows, the said liquid being readily transferred between the two bellows through the said capillary tube in response to differential pressures within the said first and second pressure chambers; means for heating an intermediate portion of the said capillary tube between the said first and second bellows; a first temperature responsive means interposed in the said capillary tube between the said heating means and the said first bellows; a second temperature responsive means interposed in the said capillary tube between the said heating means and the said second bellows; means for measuring the temperature differential between the said first and second temperature responsive means; and means for indicating the rate of change of pressure within the said first chamber relative to the aforementioned reference pressure within the said second chamber as a function of the aforementioned differential temperature.

3. Apparatus for measuring the time rate of change of pressure comprising: a first pressure resistant chamber; means for connecting the inside of the said first chamber to an external variable pressure source; a first sealed resilient bellows mounted within the said first chamber, the said first bellows being compressible in response to increased pressure and expandable in response to decreased pressure; a second pressure resistant chamber; means for connecting the inside of the said second chamber to an external variable pressure source; a second sealed resilient bellows mounted within the said second chamber, the said second bellows having characteristics similar to the said first bellows; a liquid contained within the said first and second bellows; an elongated capillary tube interconnecting the contained liquid within the said first and second bellows, the said liquid being readily transferred between the two bellows through the said capillary tube in response to differential pressures within the said first and second pressure chambers; means for heating an intermediate portion of the said capillary tube between the said first and second bellows; a first temperature responsive resistance element interposed in the said capillary tube between the said heating means and the said first bellows; a second temperature responsive resistance element interposed in the said capillary tube between the said heating means and the said second bellows; a resistance bridge circuit including the said first and second temperature responsive resistance elements as adjacent arms in the said bridge; and means for indicating the time rate of change of differential pressure between the said first and second pressure chambers as a function of the output of the said bridge circuit.

4. Apparatus for measuring the rate of change of pressure with respect to time comprising: a first pressure resistant chamber; means for connecting the inside of the said first chamber to an external variable pressure; a first sealed resilient bellows mounted within the said first chamber, the said first bellows being compressible in response to increased external pressure and expandable in response to increased internal pressure; a second pressure resistant chamber; means for connecting the inside of the said second chamber to an external variable pressure; a second sealed resilient bellows mounted within the said second chamber, the said second bellows having characteristics similar to the said first bellows; a liquid contained within the said first and second bellows; an elongated thermally conductive capillary tube interconnecting the contained liquid within the said first and second bellows, the said liquid being readily transferred between the two bellows through the said capillary tube in response to differential pressures within the said first and second chambers; means for heating a central portion of the said capillary tube between the said first and second second bellows so that decreasing thermal gradients are produced in the said thermally conductive capillary tube on each side of the said heating means; a first temperature varying resistance element interposed in the said capillary tube between the said heating means and the said first bellows; a second temperature varying resistance element interposed in the said capillary tube between the said heating means and the said second bellows; a resistance bridge circuit including the said first and second temperature varying resistance elements as adjacent arms of the said bridge; and means for indicating the time rate of change of pressure between the said first and second chambers as a function of the output of the said bridge circuit.

5. Apparatus for measuring the rate of change of pressure with respect to time comprising: a first pressure resistant chamber; means for connecting the inside of the said first chamber to an external variable pressure; a first sealed resilient bellows mounted within the said first chamber, the said first bellows being compressible in response to increased external pressure and expandable in response to increased internal pressure; a second pressure resistant chamber; means for connecting the inside of the said second chamber to an external variable pressure; a second sealed resilient bellows mounted with the said second chamber, the said second bellows having characteristics similar to the said first bellows; a liquid contained within the said first and second bellows; an elongated thin-walled capillary tube having a substantially high electrical resistance interconnecting the contained liquid within the said first and second bellows, the said liquid being readily transferred between the two bellows through the said capillary tube in response to differential pressures between the said first and second chambers; means for passing electrical current through at least a portion of the said capillary tube so that it is heated to a temperature substantially above ambient temperature; means for measuring variations in the electrical resistance of the first half of the heated portion of the said capillary tube adjacent the said first bellows; means for measuring variations in the electrical resistance of the second half of the heated portion of the said capillary tube adjacent the said second bellows; and means for indicating the rate of change of pressure with respect to time between the said first and second chambers as a function of the differences between the aforementioned measured electrical resistance variations.

References Cited by the Examiner

UNITED STATES PATENTS 2,214,181   9/1940   Rylsky _____ 73—399 X

LOUIS R. PRINCE, *Primary Examiner.*

D. O. WOODIEL, *Assistant Examiner.*